(12) United States Patent
Song et al.

(10) Patent No.: US 10,427,074 B2
(45) Date of Patent: Oct. 1, 2019

(54) ELECTROFILTRATION APPARATUS AND PROCESS

(71) Applicant: ExxonMobil Research and Engineering Company, Annandale, NJ (US)

(72) Inventors: Limin Song, West Windsor, NJ (US); Mohsen S. Yeganeh, Hillsborough, NJ (US); Clarence E. Chase, Bensalem, PA (US); Geoffrey M. Keiser, Morris Plains, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/951,241

(22) Filed: Apr. 12, 2018

(65) Prior Publication Data
US 2018/0304178 A1    Oct. 25, 2018

Related U.S. Application Data

(60) Provisional application No. 62/487,032, filed on Apr. 19, 2017.

(51) Int. Cl.
| | |
|---|---|
| *B03C 5/02* | (2006.01) |
| *B03C 9/00* | (2006.01) |
| *B03C 5/00* | (2006.01) |
| *B01D 35/06* | (2006.01) |
| *C10G 32/02* | (2006.01) |
| *C10G 1/04* | (2006.01) |

(52) U.S. Cl.
CPC .............. *B01D 35/06* (2013.01); *B03C 5/005* (2013.01); *B03C 5/024* (2013.01); *B03C 5/026* (2013.01); *B03C 9/00* (2013.01); *C10G 1/045* (2013.01); *C10G 32/02* (2013.01)

(58) Field of Classification Search
CPC .. B01D 35/06; B03C 5/00; B03C 5/02; B03C 5/024
USPC ........................................................ 209/127
See application file for complete search history.

(56) References Cited

U.S. PATENT DOCUMENTS

| | | | |
|---|---|---|---|
| 3,324,026 A | 6/1967 | Waterman et al. | |
| 3,729,402 A * | 4/1973 | Griswold | ............... B01D 35/06 204/664 |
| 3,779,857 A | 12/1973 | Hadgraft et al. | |
| 3,928,158 A | 12/1975 | Fritsche et al. | |
| 4,022,675 A | 5/1977 | Chachere | |
| (Continued) | | | |

FOREIGN PATENT DOCUMENTS

GB    1408040 A    10/1975

OTHER PUBLICATIONS

The International Search Report and Written Opinion of PCT/US2018/027218 dated Jun. 14, 2018.

(Continued)

*Primary Examiner* — Terrell H Matthews
(74) *Attorney, Agent, or Firm* — Priya G. Prasad; Andrew T. Ward

(57) ABSTRACT

Apparatuses and processes for use in electrostatic filtration are provided. The apparatuses and processes provided herein promote effective and efficient removal of solid matters even in feeds containing a relatively substantial amount of water through the use of a water spreading resistant coating.

14 Claims, 5 Drawing Sheets

(56) References Cited

U.S. PATENT DOCUMENTS

| | | |
|---|---|---|
| 4,139,441 A | 2/1979 | Bose |
| 5,308,586 A * | 5/1994 | Fritsche ................. B03C 5/024 |
| | | 204/562 |
| 8,114,274 B2 * | 2/2012 | Moran ................... C10G 1/045 |
| | | 208/187 |
| 2012/0000831 A1 | 1/2012 | Moran et al. |
| 2014/0021103 A1 | 1/2014 | House et al. |
| 2015/0192923 A1 * | 7/2015 | Apoorva ............... B81C 99/002 |
| | | 700/99 |
| 2018/0111130 A1 * | 4/2018 | Bai ........................ B03C 5/005 |
| 2018/0214892 A1 * | 8/2018 | Minhas .................... B03C 5/00 |

OTHER PUBLICATIONS

Sasaki et al., "A New Technology for Oil Management: Electrostatic Oil Cleaner", SAE Technical Paper 2002-1-1352, https://doi.org/10.4271/2002-01-1352.

\* cited by examiner

ELECTROFILTRATION APPARATUS AND PROCESS

CROSS-REFERENCE TO RELATED APPLICATIONS

This application claims the benefit of U.S. Provisional Application No. 62/487,032, filed on Apr. 19, 2017, the entire contents of which are incorporated herein by reference.

FIELD

The present application relates to an improved apparatus and process for performing electrofiltration.

BACKGROUND

Hydrocarbon streams, such as oil sands, crude oils, asphalt, bitumens, etc. typically carry varying amounts of solids within the hydrocarbon stream. Excessive inorganic or organic solids in hydrocarbon streams negatively affect hydrocarbon processing by exacerbating fouling in heat exchangers, stabilizing emulsion in desalters, as well as reducing the value of hydrocarbon products. Oil sand contains a high amount of solids which complicates oil recovery. In addition, solids can clog burners, plug catalyst feed channels and deactivate catalysts. In heat exchangers heavy crude components (e.g. asphaltene) adsorb onto solids causing them to attach onto the tube surface. The adsorbed solids provide a nucleating growth site for the foulant. In a desalter, solids adsorb onto the water/oil interface, preventing electrocoalescence within the electrodes of the desalter. Solids can also reside at the effluent water/oil interface at the bottom of a desalter and prevent coalesced water droplets from immersing into the effluent water. This creates a rag layer that is detrimental in the desalting operation.

One option for removing the non-petroleum material is to first mix the raw product with water. For example, a water extraction process can be used to separate a majority of the non-petroleum material from the desired raw crude or bitumen. A water extraction process can remove a large proportion of the solid, non-petroleum material in the raw product. However, after the initial water extraction process, smaller particles of non-petroleum particulate solids will typically remain with the oil phase at the top of the mixture. This top oil phase is sometimes referred to as a froth. Separation of the smaller non-petroleum particulate solids can be achieved by adding an additional solvent to the froth of the aqueous mixture. This is referred to as a "froth treatment". For example, a paraffinic solvent such as heptane can be added to the froth to cause a phase separation between an aqueous based phase and a bitumen phase. Unfortunately, due to the nature of the paraffinic solvent, a portion of the potential petroleum product is lost with the aqueous phase. The petroleum product lost with the aqueous phase may include a substantial portion of asphaltenes.

As an alternative to a water extraction, a non-aqueous extraction can be performed to separate crude oil from oil sands. Use of a non-aqueous extraction solvent can reduce or minimize the amount of water needed for extraction of crude oil from oil sands, and can potentially eliminate the need to perform a subsequent froth treatment. However, use of a non-aqueous extraction solvent can increase the amount of fine particulate matter that remains in the bitumen phase. The presence of an elevated content of fine particulate matter can create difficulties when attempting to transport such a non-aqueous extracted crude oil via pipeline.

Electrofiltration techniques have been proposed and studied for removal of solids from hydrocarbon liquids. Commercial electrofiltration systems are developed and available on market today, and have been used to process refinery feed such as FCC bottom slurry oils and lubricant or hydraulic oils. Electrofiltration has advantages over other separation techniques. It does not have moving parts so it is reliable and simple to operate. It is also inherently energy-efficient because of the selective interaction of the particulate with the electric field. However, prior art electrofiltration technologies are effective and efficient to remove solid matters only when feeds are largely free of water. The presence of water in the feed can cause operation failure of those systems and/or significantly reduce the separation efficiency, which greatly limits their commercial value because most of the hydrocarbon liquids do contains various amount of dispersed water. For example, the oils produced from a reservoir almost always contains substantial amount of water even after water separation. Water are often used to process oils such as bitumen extraction from oil sands, de-salting of crude in refineries, steam stripping processes in chemical plants. The processed hydrocarbon liquids are inevitably left with residual of the water. Prior art solutions to the problem of dispersed water in electrofiltration techniques generally involve removing water from the hydrocarbon by such processes as heat drying, air stripping, absorption removal, gravity separation, or centrifugal separation. These methods generally add significant cost to electrofiltration methods, thereby defeating the low-cost and low energy advantages of electrofiltration technology. There is a need for an improved electrofiltration technology that allows processing the feed in the presence of dispersed water.

U.S. Pat. No. 8,114,274 describes a method for treating bitumen froth with high bitumen recovery and dual quality bitumen production. The method includes using multiple gravity settling steps to separate phases containing bitumen in a hydrocarbon diluent from phases containing water, fine solids, and residual bitumen. Naphtha is provided as an example of a hydrocarbon diluent. One described advantage of the method is generation of a lighter bitumen stream that is suitable for transport by pipeline without further processing.

U.S. Published Patent Application 2012/0000831 describes methods for separating out a solvent feed after use in recovery of bitumen from oil sands. The method includes treating a bitumen froth with a paraffinic or naphthenic type diluent to produce bitumen and froth treatment tailings. Toluene is identified as a naphthenic type diluent that can improve bitumen recovery from tailings.

U.S. Published Patent Application 2014/0021103 describes methods for extracting bitumen from an oil sand stream. The method includes contacting the oil sand stream with a non-aqueous solvent and then screening the combined oil sand and solvent stream to form a screened oil sand stream and a rejects stream. Bitumen is then extracted from the screened oil sand stream.

U.S. Pat. No. 5,308,586 describes an electrostatic separator using a bead bed. The separator is described as being suitable for separating FCC catalyst fines from an FCC slurry oil. The electrostatic separator is periodically back-flushed with additional treated slurry oil to remove particles from the separator. These backflushed particles are returned to the FCC reactor.

SUMMARY

Apparatuses and processes for electrostatic separation are provided. In one aspect, an electrostatic separator is provided comprising a vessel containing a plurality of dielectric elements arranged as a bed; wherein the elements are coated with a water spreading resistant material; and an electrode for applying an electric potential gradient across said bed. The dielectric element can include beads, rods, fibers, or any other three-dimensional shape that can be used to generate non-uniform electric fields and as a solid filtration matrix. In a certain embodiment, the dielectric elements are glass beads. The water spreading resistant material will generally have a water contact angle on a flat surface from 75°-120°, e.g. from 85°-115°. Specific water spreading resistant materials include siloxanes, fluorocarbon, and polystyrene.

In another aspect, methods for removing solids from a hydrocarbon stream are provided. The method comprises providing a hydrocarbon stream with an amount of suspended solids; feeding the hydrocarbon stream to an electrostatic separator similar to the one described immediately above; applying a voltage across the electrostatic separator to induce an electric field thereby causing a percentage of the suspended solids to stick to the plurality of dielectric beads arranged as a bed; and purging the bed to remove the separated solids.

In certain aspects the hydrocarbon stream contains dispersed water particles and non-petroleum particles. In one aspect, the dispersed water particles make up 1% or less by weight of the hydrocarbon stream. In certain aspects, the non-petroleum particle content is from 2500 wppm to 30000 wppm.

In yet another aspect, the voltage across the electrostatic separator remains substantially constant over time for a given distance from the electrode even in the presence of water. The described methods may additionally include recovering a filtered hydrocarbon stream, wherein the filtered hydrocarbon stream has a non-petroleum content of 500 wppm to 1200 wppm.

DETAILED DESCRIPTION

Definitions

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and processes encompassed are not limited to the specific embodiments described below, but rather, include all alternatives, modifications, and equivalents falling within the true spirit and scope of the appended claims.

Figure 1:
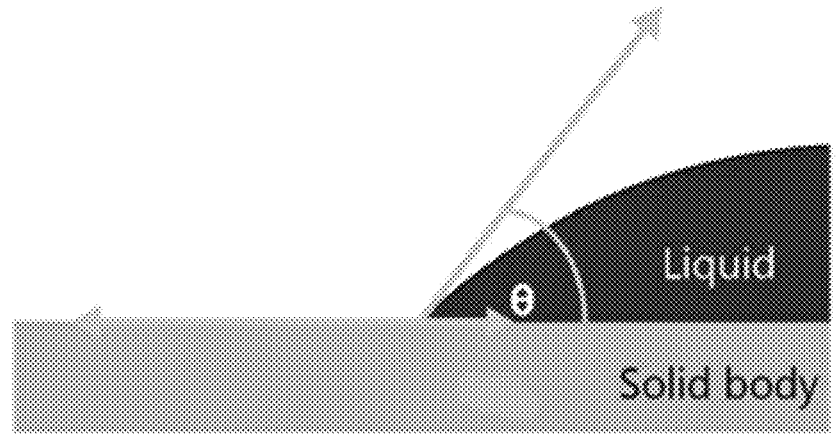
FIG. 1 is an illustration of the term contact angle as used herein.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting As used herein, the term "contact angle" refers to the angle between the surface of the liquid and the outline of the contact surface when an interface exists between a liquid and a solid. It is a measure of wettability of a solid surface by a liquid. FIG. 1 illustrates contact angle has used herein. The contact angle is depicted in FIG. 1 as θ and is about 50°. This would indicate a surface on which water moderately spreads to wet the solid. A 0° contact angle indicates that a surface that is completely wetted by the liquid. A 90° contact angle indicates a surface that is poorly wetted by the liquid.

As used herein, the term "water spreading resistant" refers to a substance or a moiety, which lacks an affinity for water. A water spreading resistant surface would be one that has a contact angle with water on a smooth surface of between 70-150°, preferably 75-120°, more preferably 85-115°.

As used herein, the term "hydrophobic" refers to a substance or a moiety, which lacks an affinity for water. That is, a hydrophobic substance or moiety tends to substantially repel water, is substantially insoluble in water, does not substantially mix with or be wetted by water or to do so only to a very limited degree and/or does not absorb water or, again, to do so only to a very limited degree. In some text books, "hydrophobic" refers to a substance or moiety which has a contact angle with water 90° or greater. As used herein, however, hydrophobic is intended to be synonymous with "water spreading resistant" described above, which would include the ranges of contact angles enumerated therein including, for the avoidance of doubt, those parts of the ranges less than 90°.

As used herein, the term "hydrophilic" refers to substance or a moiety, which has an affinity for water. That is, a hydrophilic substance or moiety tends to substantially attract water, is substantially soluble in water, and/or is substantially miscible with or wetted by water.

Overview of Electrofiltration

The working principle of separating particulates from resistive oils is reviewed briefly as follows. Consider a small particle in an inhomogeneous electric field. The total force on a particle due to interaction of particle with the electric field is given by the equation:

$$\vec{F} = q\vec{E} + (\vec{p} \cdot \nabla)\vec{E}$$

Where q is particle charge, p is the polarization of the particle, E is the electric field intensity, and ∇ is electric potential gradient operator. The first term on the right side of equation (qE) arises only when the particle itself carries a net charge either due to an inherent charge or induced charge. The particle motion due to this force is called electrophoresis (EP). The second term ((p×∇)E) is due to dipole-type interaction with a non-uniform electric field. The particle motion due to this force is called dielectrophoresis (DEP).

For simplicity, consider a small lossless particle in a lossless liquid. As used herein, the term "lossless" means zero conductivity or zero electricity lost. The dipole moment on the particle in the electric field due to polarization is:

$$\vec{p} = 4\pi\varepsilon_f a^3 K \vec{E}$$

$$K = \frac{\varepsilon_p - \varepsilon_f}{\varepsilon_p + 2\varepsilon_f}$$

where $\varepsilon_f$ and $\varepsilon_p$ are dielectric constants of the fluid and particle, respectively, and a is the radius of the lossless particle assuming the particle is modelled as a sphere. In a typical hydrocarbon suspension system, the dielectric constant of the particles is larger than that of oils so the value of K is usually positive and the dipole moment of polarized particle is parallel to the electric field. With presence of a gradient of non-uniform electric field, the particle will move to the point of higher electric field intensity due to the DEP force Generation and use of the DEP forces on particles for particle-liquid separation is advantageous over using the EP force because it can move neutral particles (non-changed). This is particularly important for removal of particles from a loss liquid because it is very difficult to maintain a charge in a loss (conductive) liquid. Thus, particles in a loss liquid are more or less not charged and the EP effect is negligible. However the DEP force is a secondary force and relatively small for small particles (proportional to cubic of particle size). Therefore; generation of high gradient electric field is the key to cause substantial separation by DEP processes. For a given particle size, the magnitude of the DEP force on the particle is proportional to:

$$|\vec{F}_{DEP}| \sim \frac{|\vec{E}|^2}{L}$$

where L is a characteristic length associated non-uniformity of the electric field. Obviously increasing the intensity of the electric field will increase the gradient for given L, but there are many practical constraints to the magnitude of E such as liquid break-down, excessive current flow and equipment concerns. Another option is to reduce the length L. There are pre-dominantly two ways to produce small L: use of micro-electrodes or dielectric barrier (also called remote electrodes). The use of dielectric barriers is advantageous for large scale separation, which is discussed here.

Figure 2:
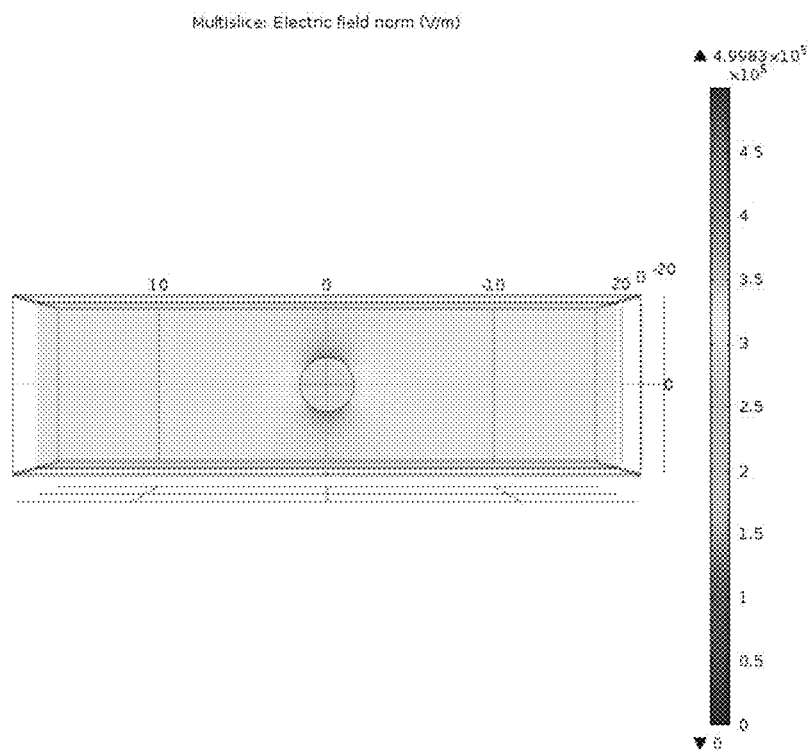
FIG. 2 is an illustration of a relatively uniform electric field surrounding a glass sphere placed in oil.
Figure 3:
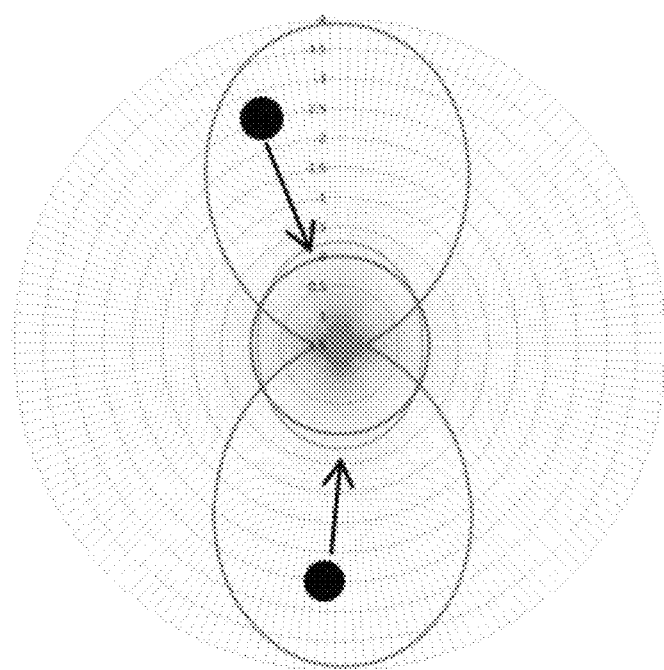
FIG. 3 is an illustration of relative dielectrophoresis force as a particle becomes more proximate to the glass sphere.

Consider a glass sphere placed in oil that is subject to a relatively uniform electric field $E_0$ as shown in FIG. 2. Because of the difference in the dielectric constant between glass and oil, the glass sphere is polarized and a secondary electric field is induced around the sphere. It is this secondary electric field that produces a local gradient near the surface of the glass sphere. When a small but charge-neutral particle is present near the glass sphere, a DEP force is generated on the particle due to the local gradient of the electric field. The DEP force will move the particle to the surface of the glass sphere where the gradient is the higher, and can be captured by the sphere if adhesion force is strong enough against other forces such as inertia, flow-induced drags, gravity, or Brownian motion. This DEP force on the particle in the direction of the center line between the particle and the glass sphere is proportional to:

$$F_{DEP} = 4\pi\varepsilon_f K a^3 \frac{E_0^2}{R} f(\theta, K_{sphere,oil})$$

where R is the radius of the sphere. The DEP force is illustrated in an ideal case shown in FIG. 3, which depicts the force being much stronger as the particle approaches the glass sphere's surface.

In a practical electric filter design, many of glass beads are used to fill the space between two electrodes to create a dielectric bed that has dual function: generation of local high electric-field gradient points and provision of a medium to capture and store captured particles. As used herein, a "dielectric" barrier is one with a high dielectric constant and near zero conductivity. Example materials include glass, ceramic, and even dry sands. Though the dielectric barrier is designed to produce DEP force to capture the charge-neutral particles, it also enhances capture of charged particles. This can be illustrated by the fact that glass sphere in a relatively uniform electric field also produce higher intensities near the surface, as shown in FIG. 2, which could produce a higher EP effect.

Performing an electrostatic separation on a hydrocarbon stream can be effective for reducing the non-petroleum particle content of the bitumen product to a desired level. For example, a hydrocarbon stream after any optional physical separation of non-petroleum particles and prior to electrostatic separation can have a non-petroleum particle content of at least about 2500 wppm, or at least about 4000 wppm, or at least about 5000 wppm, or at least about 7500 wppm, or at least about 10000 wppm, and optionally up to about 30000 wppm or more. After electrostatic separation, the hydrocarbon product can have a non-petroleum particle content of about 1200 wppm or less, or about 1000 wppm or less, or about 750 wppm or less, or about 500 wppm or less.

The Dispersed Water Problem

Consider a small water droplet near the surface of a glass element in the filtration bed. As discussed herein, the term "element" can include beads, rods, fibers, or any other three-dimensional shape that can be used to generate non-uniform electric fields and as a solid filtration matrix. Since the water droplet is easily polarized by an electric field, a relatively stronger DEP force is generated between the droplet and the glass sphere as compared to a suspended particle and the glass sphere. The force will move the droplet to the surface of the glass sphere and eventually makes the droplet to contact with glass surface. Since the glass surface is typically hydrophilic, the droplet may spread on the glass surface due to interfacial effect.

Figure 4:
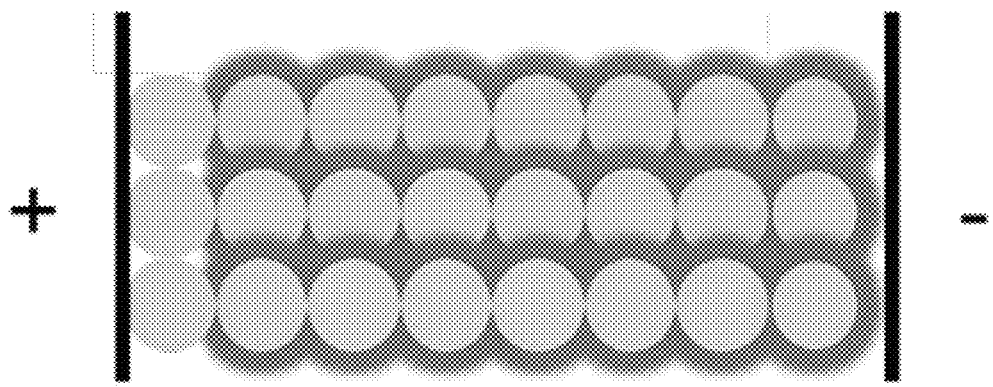
FIG. 4 is an illustration of a water film network that can form over a glass bead bed with hydrocarbon feeds that contain dispersed water.
Figure 5:
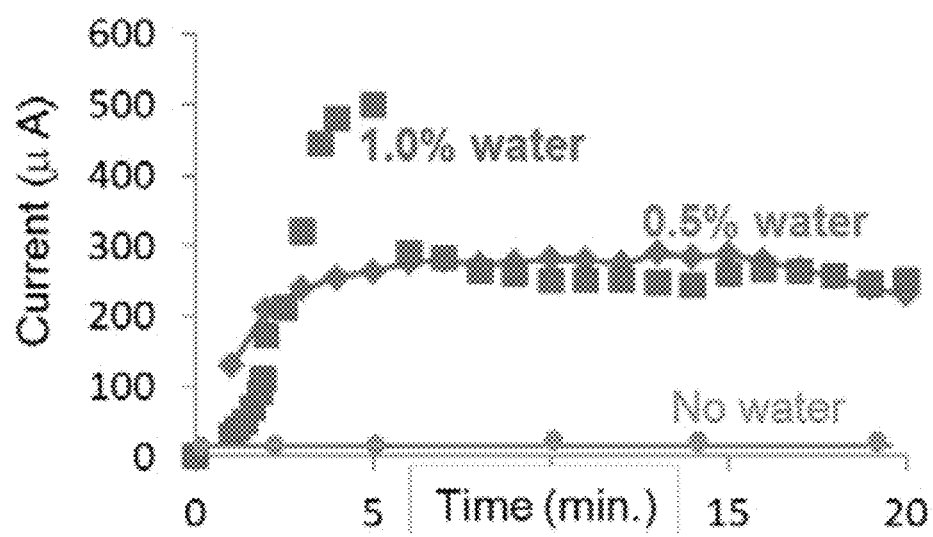
FIG. 5 is a graphical representation of the increase in current than can occur across conventional electrostatic separators when hydrocarbon feeds contain dispersed water molecules.

Now consider the case in which there are many small water droplets in a hydrocarbon stream moving through the bed of beads. The water droplets will move to the glass bead surface and spread on the surfaces. With time, a water film may form over the glass bead surface, generating a water film network as illustrated in FIG. 4. The formation water films and subsequent water film network is detrimental to separation of particles from oils in several ways. First, excessive current will be drawn due to the high conductivity of water as shown in FIG. 5. In industrial electrostatic filters, a tripping limit of current is often set due to constraints on equipment. Excessive current causes in-service electrostatic separators to trip too frequently for adequate operational efficiency. Second, the water film or water film network may effectively screen the glass bead bed from the electric field and make the bed ineffective for producing an electric field gradient and DEP force.

Solving the Dispersed Water Problem

Because most hydrocarbon liquids can contain dispersed water, provided herein is an electrostatic filter and process to reduce or eliminate the undesirable effect of water on the performance and operation of electro-filtration. Removing water prior to electro-filtration can be done with various methods such as distillation, drying or other techniques. But most of time, pre-condition of the oil to remove water to a degree that allows effective particle separation by electro-filtration is costly and not practical. Therefore methods allowing separation with water present is highly desirable and would greatly expands the application of the electro-filtration to process various liquids.

Here, the glass bead surface is treated with a thin layer of a chemical coating so that the surface becomes water spreading resistant while maintaining a high effective dielectric property as a whole. When the beads are coated, the water droplets will not adhere to the bead surface, the water network will not be formed, and the bead bed will maintain high-resistivity so that the current flowing through the bed will be low. Investigation of this theory can best be explained with reference to the examples.

Example 1: Applying a Coating to Glass Beads

Figure 7:
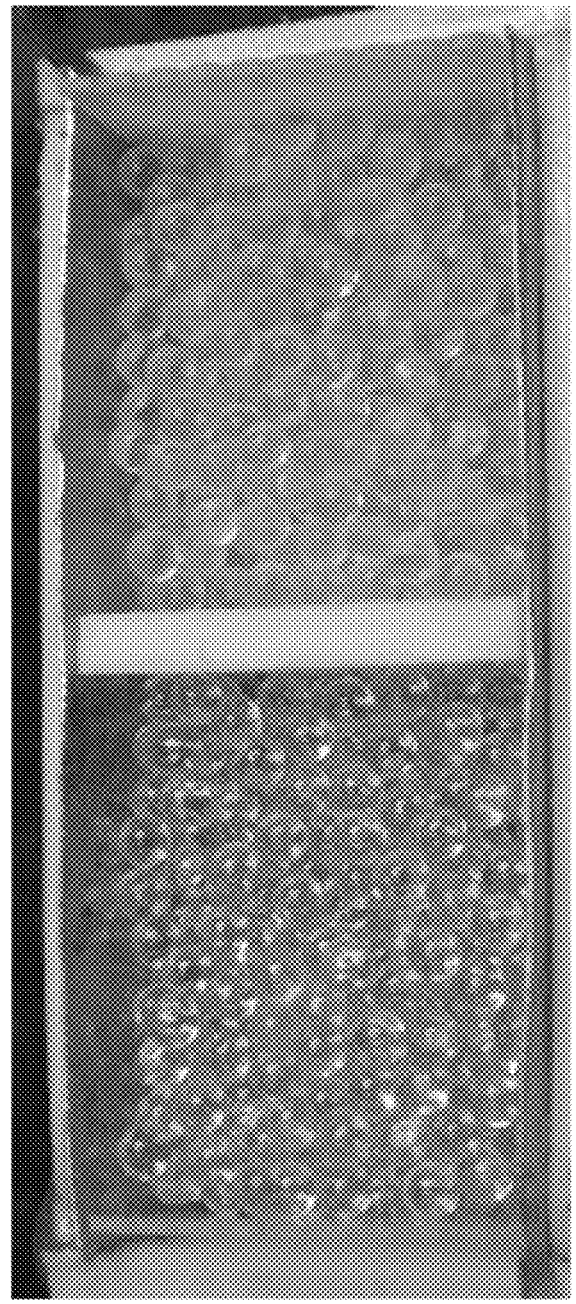
FIG. 7 depicts a photograph of beads with a hydrophobic coating (left) and beads without a hydrophobic coating (right).

Commercially available glass beads (3 mm sodium-lime glass) were treated with a mixture solution of 4% polystyrene in toluene. The glass beads were placed in the solution at room temperature for about 2 min and then dried over a Teflon sheet. Then treated beads were placed in vacuum oven and heated for 4 hours at 110° C., which dried off any remaining toluene and left a thin layer of solid hydrophobic polystyrene coating on the glass bead surface. FIG. 7 shows original uncoated beads (right) and coated beads (left) side by side.

Example 2: Voltage Across Uncoated Beads Over Time

Figure 6:
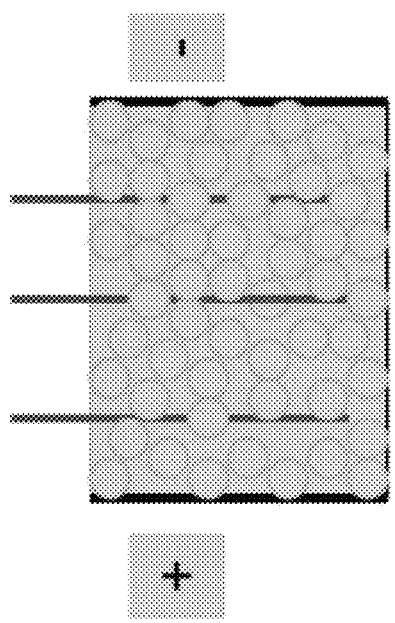
FIG. 6 is an illustration of the experimental setup used in Examples 1 and 2.
Figure 8:
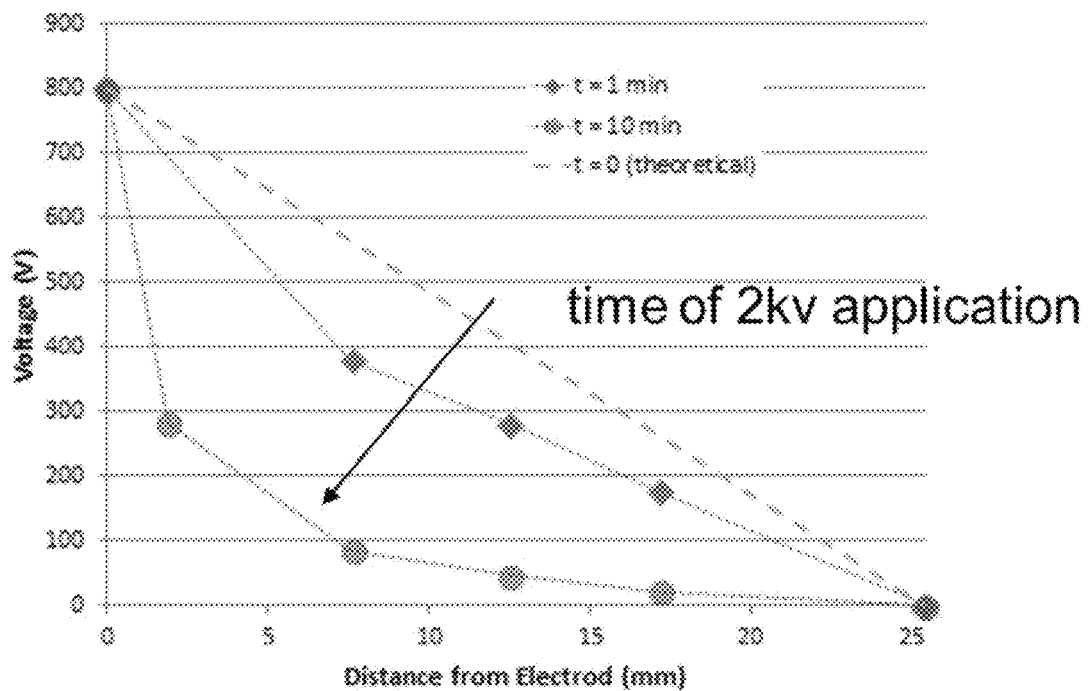
FIG. 8 is a graphical representation of voltage decrease over time in Example 1.

As discussed above, the water film or water film network may effectively screen the glass bead bed from the electric field and make the bed ineffective for producing an electric field gradient and DEP force. To investigate the possibility that the presence of water could effectively coat glass beads in an electrostatic filter thereby screening the bed from an electric field, voltage distribution was measured in a small chamber filled with a water-in-oil emulsion and uncoated commercially available 3 mm Sodium-lime glass beads. The chamber was subject to high-voltage across two parallel electrodes. Copper pins were placed at different location across the chamber to measure the induced voltages. The experimental setup is depicted in FIG. 6. Treck's Infinitron 821HH electrostatic meter was used to measure voltage. Voltage measured on each pin represents the average static-charge induced by the electric field. The theoretical case should show a nearly linear relationship of voltage with distance from positive electrode on which a high voltage is applied. When the chamber is filled with water-in-oil emulsion, the voltage distribution is changes with time as shown in FIG. 8. In the experiment, a higher voltage (2 kV) is applied to the chamber for a period of time, then a lower voltage (800 V) is used to measure the voltage distribution in the chamber. As shown in FIG. 8, with increasing time of high-voltage treatment, the voltage field within the chamber diminished. Consequently the electric field strength, $E_0$, is significantly reduced. Since both of EP and DEP forces are directly depend on the strength of the electric field, it is expected that separation of particles from oil with presence of dispersed water would suffer.

Example 3: Voltage Across Coated Beads Over Time

Figure 9:
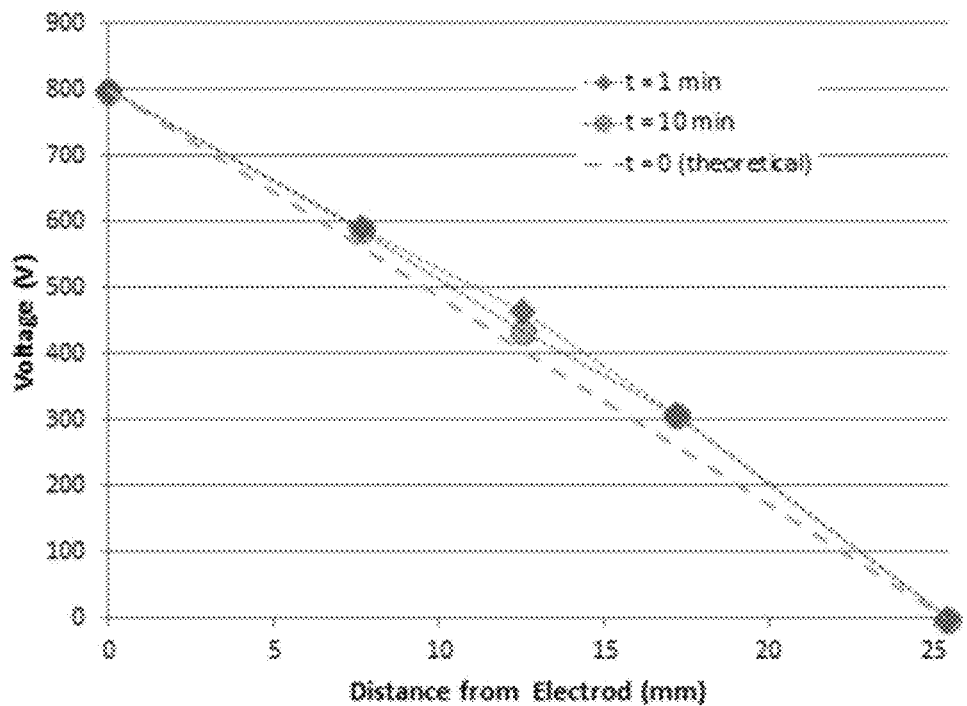
FIG. 9 is a graphical representation of voltage decrease over time in Example 2.

A bed of beads coated with a hydrophobic coating prepared as described in Example 1 were subjected to the same experimental setup described in Example 2. The results are shown in FIG. 9. As shown, the coated beds retain voltage, and therefore electric field, in the chamber over time. Thus, beads with a hydrophobic coating can enable electrostatic filtration to separate particulates in hydrocarbon streams having dispersed water.

Example 4: Contact Angle Measurement of Uncoated Glass Beads

A clean flat smooth glass surface was used to determine the degree of water spreading resistance using water contact angle measurement. A flat smooth glass surface was cleaned first with ethanol and then heptane before drying with nitrogen gas. The water contact angle was measured on various spots of the glass surface using a KRUSS DSA 100 instrument via the tangent drop method, wherein the contact angle is measured using the image of a sessile drop at the points of intersection between the drop contour and the projection of the surface. 18 Mohm water was used for this measurement. The average water contact angle measured was 27°+/−1°. It is known that surfaces with water contact angle well-below 90° degrees have low resistance against water spreading. This example demonstrates that water can spread over a glass surface.

Example 5: Contact Angle Measurement of Uncoated Glass Beads

A flat smooth glass surface was coated with polystyrene to determine the degree of water spreading resistance using water contact angle measurement. A flat smooth glass surface was cleaned first with ethanol and then with heptane before drying with nitrogen gas. The clean dry glass surface was then left in air plasma for two minutes for further cleaning of the surface. The plasma cleaned surface was immersed in a 4% polystyrene in toluene solution for about two minutes before drying with nitrogen gas. The polystyrene treated surface was placed in a vacuum oven and heated for four hours at 110° C., which dried off any remaining toluene and left a thin layer of solid polystyrene coating on the flat smooth glass surface.

The water contact angle was measured on various spots of the polystyrene coated surface using a KRUSS DSA 100 instrument via the tangent drop method, wherein the contact angle is measured using the image of a sessile drop at the points of intersection between the drop contour and the projection of the surface. 18 Mohm water was used for this measurement. The average water contact angle measured was 89°+/−2°. This example demonstrates that polystyrene coated surface resists against water film formation.

Additional Embodiments

Embodiment 1

An electrostatic separator, comprising: a vessel containing a plurality of dielectric elements arranged as a bed; wherein the elements are coated with a water spreading resistant material; and an electrode for applying an electric potential gradient across said bed.

Embodiment 2

The separator of embodiment 1, wherein the water spreading resistant material comprises one of siloxanes, fluorocarbon, and polystyrene.

Embodiment 3

The separator of embodiment 1 or 2, wherein the water spreading resistant material comprises polystyrene.

Embodiment 4

The separator of any of the previous embodiments, wherein the dielectric elements are glass beads.

Embodiment 5

The separator of any of the previous embodiments, wherein the water spreading resistant material has a water contact angle on a flat surface from 75°-120°.

Embodiment 6

The separator of any of the previous embodiments, wherein the water contact angle on a flat surface is from 85°-115°.

Embodiment 7

A method for removing solids from a hydrocarbon stream, comprising: providing a hydrocarbon stream with an amount of suspended solids; feeding the hydrocarbon stream to the electrostatic separator of claim 1; applying a voltage across the electrostatic separator to induce an electric field thereby causing a percentage of the suspended solids to stick to the plurality of dielectric beads arranged as a bed; and purging the bed to remove the separated solids.

Embodiment 8

The method of embodiment 7, wherein the hydrocarbon stream contains dispersed water particles.

Embodiment 9

The method of embodiment 8, wherein the dispersed water particles make up 1% or less by weight of the hydrocarbon stream.

Embodiment 10

The method of any of embodiments 7 to 9, wherein the voltage across the electrostatic separator remains substantially constant over time for a given distance from the electrode.

Embodiment 11

The method of any of embodiments 7 to 10, wherein the water spreading resistant material comprises one of siloxanes, fluorocarbon, and polystyrene.

Embodiment 12

The method of any of embodiments 7 to 11, wherein the water spreading resistant material is polystyrene.

Embodiment 13

The method of any of embodiments 7 to 12, wherein the water spreading resistant material has a water contact angle on a flat surface from 75°-120°.

Embodiment 14

The method of any of embodiments 7 to 13, wherein the water contact angle on a flat surface is from 85°-115°.

Embodiment 15

The method of any of embodiments 7 to 14, wherein the hydrocarbon stream has a non-petroleum particle content from 2500 wppm to 30000 wppm.

Embodiment 16

The method of any of embodiments 7 to 15, further comprising recovering a filtered hydrocarbon stream.

Embodiment 17

The method of any of embodiments 7 to 16, wherein the filtered hydrocarbon stream has a non-petroleum particle content of 500 wppm to 1200 wppm.

The invention claimed is:
1. An electrostatic separator, comprising:
   a vessel containing a plurality of dielectric elements arranged as a bed; wherein the elements are coated with a water spreading resistant material, comprising one of siloxanes, fluorocarbon, and polystyrene and having a water contact angle on a flat surface of 75°-120°; and
   an electrode for applying an electric potential gradient across said bed.
2. The separator of claim 1, wherein the water spreading resistant material comprises polystyrene.
3. The separator of claim 1, wherein the dielectric elements are glass beads.
4. The separator of claim 1, wherein the water contact angle on a flat surface is from 85°-115°.

5. A method for removing solids from a hydrocarbon stream, comprising:
   providing a hydrocarbon stream with an amount of suspended solids;
   feeding the hydrocarbon stream to the electrostatic separator of claim 1;
   applying a voltage across the electrostatic separator to induce an electric field thereby causing a percentage of the suspended solids to stick to the plurality of dielectric beads arranged as a bed; and
   purging the bed to remove the separated solids.

6. The method of claim 5, wherein the hydrocarbon stream contains dispersed water particles.

7. The method of claim 6, wherein the dispersed water particles make up 1% or less by weight of the hydrocarbon stream.

8. The method of claim 6, wherein the voltage across the electrostatic separator remains substantially constant over time for a given distance from the electrode.

9. The method of claim 5, wherein the water spreading resistant material is polystyrene.

10. The method of claim 5, wherein the water spreading resistant material has a water contact angle on a flat surface from 75°-120°.

11. The method of claim 10, wherein the water contact angle on a flat surface is from 85°-115°.

12. The method of claim 5, wherein the hydrocarbon stream has a non-petroleum particle content from 2500 wppm to 30000 wppm.

13. The method of claim 5, further comprising recovering a filtered hydrocarbon stream.

14. The method of claim 13, wherein the filtered hydrocarbon stream has a non-petroleum particle content of 500 wppm to 1200 wppm.

* * * * *